United States Patent [19]
Thumberger

[11] 3,855,131
[45] Dec. 17, 1974

[54] GYRATORY FILTER

[76] Inventor: Harold C. Thumberger, 1031 Belle Ave., Hamilton, Ohio 45015

[22] Filed: June 5, 1973

[21] Appl. No.: 367,166

[52] U.S. Cl.............. 210/383, 210/391, 210/398, 210/407, 209/269, 209/302, 209/306, 209/381, 55/300
[51] Int. Cl............................................ B01d 33/00
[58] Field of Search ......... 210/398, 19, 383, 77, 79, 210/384, 388, 232, 391, 407, 497; 55/300, 299; 209/304, 306, 379, 269, 381, 302, 382, 357, 358, 293, 323, 448, 449, 452

[56] References Cited
UNITED STATES PATENTS

| | | | |
|---|---|---|---|
| 1,056,033 | 3/1913 | Kubosch | 55/300 |
| 1,757,834 | 5/1930 | Haegler | 55/300 |
| 2,167,236 | 7/1939 | Gieseler | 210/388 |
| 2,274,352 | 2/1942 | Wood | 210/497 |
| 2,672,986 | 3/1954 | Lichtgarn | 210/19 |
| 3,262,568 | 7/1966 | Zehrbach | 210/388 |
| 3,326,383 | 6/1967 | Pranovi | 210/407 |
| 3,633,753 | 1/1972 | Petitjean | 210/497 |

Primary Examiner—Charles N. Hart
Assistant Examiner—F. F. Calvetti
Attorney, Agent, or Firm—Wood, Herron & Evans

[57] ABSTRACT

Filtering apparatus including a container having an inlet and an outlet and a filter interposed between the inlet and the outlet. The filter has a bottom plate fixed to the outlet and a top plate connected to a motor for gyrating the top plate. The two plates are connected by a helical spring and a filtering screen surrounding the spring.

7 Claims, 3 Drawing Figures

PATENTED DEC 17 1974  3,855,131

GYRATORY FILTER

This invention relates to a filter for separating particles from a fluid and more particularly, the invention is directed to a vibrating filter which is interposed in the path of a fluid, usually liquid, the filter being vibrated so as to shake from its filtering screen the particles impinging upon it thereby continuously cleaning the filter.

Filters of the type to which the present invention is directed include a filtering medium such as a screen, the fineness of the screen mesh being determined by the size of the particles to be filtered, which is interposed in the path of a fluid containing particulate matter which is to be removed from the fluid. Such filters are used for example in the cleaning of the coolant or lubricating liquid employed in metal cutting machines wherein the shavings removed from a metal blank become entrained in the liquid and must be removed from the liquid in order for the liquid to be reused.

A great many of filters have been designed which are static, that is mounted in a fixed position with respect to the fluid to be cleaned. While such filters can perform satisfactorily, they are subject to the disadvantage that the filtering medium is rapidly subjected to a build-up of a particulate matter to be separated from the liquid and must be regularly cleaned or replaced.

In other types of filters provision is made for imparting motion to the filtering medium but none of these, which are found in the patent literature, seems to have made any impact on the marketplace presumably because of their inability to perform well and at a reasonable cost.

An objective of the present invention has been to provide an improved filter having a screen as the filtering medium and to provide improved means for supporting the screen and for imparting movement to the screen to maintain it clean during the filtering operation. To this end, the invention contemplates a filter having top and bottom plates, a helical spring mounted between the top and bottom plates and a screen surrounding the helical spring. The filter is mounted in a container with the bottom plate having a hole in communication with an outlet in the container and the upper plate being connected to a motor driven shaft for gyrating the upper plate.

The combination described above provides excellent cleaning action as fluid flowing through the container passes through the screen. The screen, being fixed at its lower end and gyrated at its upper end while supported around its circumference by the helical spring within the screen tends to throw or flick the impinging particles off the screen. In addition to the mechanical action of flicking the particles off the filter screen, the gyratory or vibratory action of the filter screen which causes it to move rapidly back and forth in the liquid produces an additional cleaning action due to the relative motion of the screen and the liquid. Thus, visualizing the interior of the filter as containing filtered liquid, a rapid movement of the screen causes a portion of the clean fluid to be forced out through the holes in the screen so as to carry away from the screen the particles which have impinged upon the screen.

The several features and objectives of the present invention will become more readily apparent from the following detailed description taken in conjunction with the accompanying drawings in which.

Figure 1:
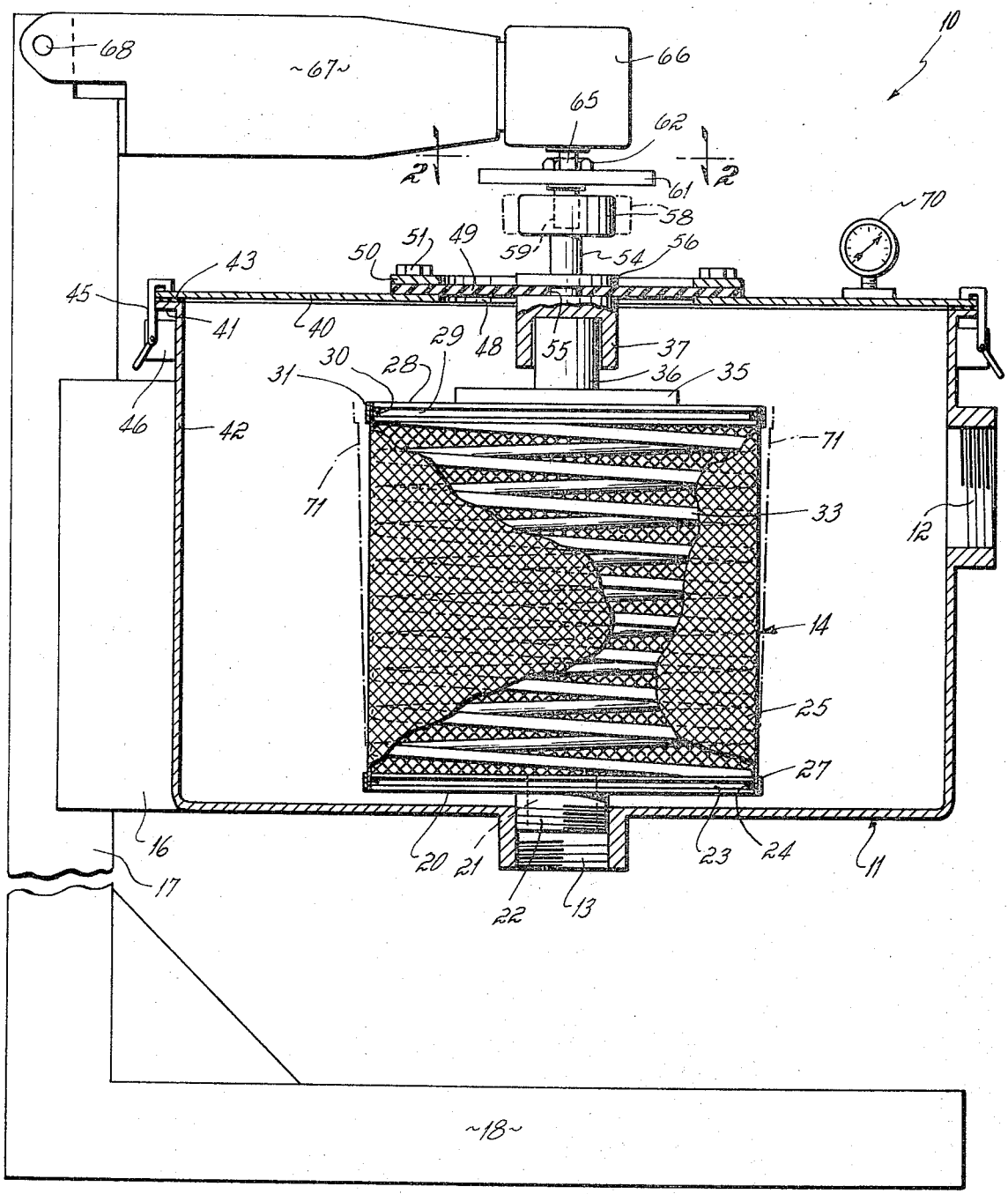
FIG. 1 is an elevational view, partly in section showing the invention.

The filtering apparatus indicated at 10 includes a container 11 having an inlet 12, an outlet 13 and a filter 14 interposed between the inlet and outlet.

The container 11 is supported by a bracket 16 which is fixed to a post 17, the post being in turn secured to a base 18.

The filter includes a bottom plate 20 having a central hole or orifice 21 communicating with the outlet 13.

The bottom plate has a nipple 22 which is threaded into mating threads in the outlet 13. The plate 20 has an O-ring groove 23 and O-ring 24 mounted in the groove. A generally cylindrical screen 25 surrounds the plate 20 and projects upwardly from it, the lower edge of the screen being clamped to the plate and O-ring by a band 27 such as a large hose clamp.

At the upper end of the filter 14 is a top plate 28 similar to the bottom plate 20, the top plate having an O-ring groove 29 and O-ring 30 within the groove. The upper edge portion of the screen 25 is clamped to the plate 28 and the O-ring 30 by a band 31 identical to the band 27.

Within the filter is a helical spring 33 which is maintained under compression between the top and bottom plates. The spring 33 has an outside diameter which is substantially the same as the inside diameter of the screen thereby providing a support for the screen 25 which surrounds the spring.

A plate 35 having a fixed stub shaft 36 is fixed to the upper surface of the top plate 28. The stub shaft is received in a cup 37 which is gyrated as will be described below.

The mechanism for gyrating the cup 37 includes a cover 40 for the container, the cover being secured to an upper annular flange 41 integral with the vertical walls 42 of the container. An elastomeric seal 43 is sandwiched between the cover 40 and the flange 41, the two elements 40 and 41 being clamped together by a plurality of over-center toggle clamps 45 mounted around the periphery of the upper portion of the container by means of brackets 46.

The cover 40 has a large central opening 48 which is closed by an elastomeric cup support and seal 49 and the cup 37. The cup support 49 is clamped to the cover 40 by a ring 50 and a plurality of bolts 51 spaced around the circumference of the ring 50, the bolts passing through the ring and the port and being threaded into the cover.

The cup 37 has a shaft 54 fixed to it and projecting upwardly through a hole 55 in the center of the elastomeric support 49. The cup is clamped to the support 49 by a ring 56 fixed to the shaft 54. Thus the cup 37 is supported by the support 49 and yet capable of gyratory movement with respect to the cover 40 as permitted by the resilience of the support 49.

The upper end of the shaft 54 terminates in a circular skate wheel 58 which is concentrically mounted with respect to the shaft 54. The wheel 58 is engaged by an adjustable boss 59 mounted in an arcuate slot 60 in a plate 61. The boss is fixed in any selected position in the slot 60 by a bolt 62 threaded into the boss as at 63. The plate 61 is mounted on a shaft 65 projecting from a motor 66. The motor is in turn mounted on an arm 67 which is pivoted at 68 to the post 17 so as to enable it to be lifted up out of the way when the cover 40 is to be removed for cleaning out the container 11.

The arcuate slot 60 is formed in the plate 61 so that a shift of the position of the boss 59 with respect to the slot changes the radial position of the boss with respect to the shaft 65 thereby altering the "throw" of the gyratory action imparted by the boss to the wheel 58 and hence the filter 14.

The apparatus may include a gauge 70 for monitoring the pressure within the container 11.

In the operation of the invention, fluid to be filtered is introduced through the inlet 12, the fluid passing through the screen 25 of the filter 14 and out through the outlet 13. Particulate material entrained in the liquid impinges upon the screen 25 and is continuously removed from the screen due to the gyratory action of the screen as will be described, the particulate material dropping down to the bottom of the container 11 from which it is periodically cleaned out.

Figure 3:
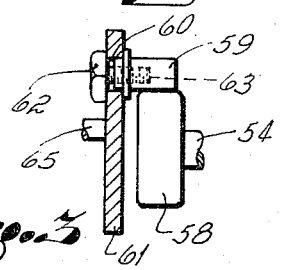
FIG. 3 is a cross-sectional view taken along lines 3—3 of FIG. 2.
Figure 2:
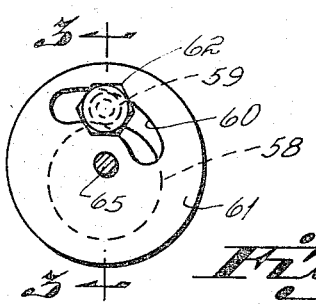
FIG. 2 is a cross-sectional view taken along lines 2—2 of FIG. 1.

As the fluid passes through the container and filter, the motor 66 is energized thereby rotating the shaft 65 and the eccentrically mounted boss 59. The boss revolves about the wheel 58. As shown in FIGS. 2 and 3, the position of the boss 59 within the slot 60 determines the extent of the misalignment between the axes of the shaft 65 on the motor and the shaft 54 on the cup 37. That degree of misalignment will be one-half the throw of the cup 37 and hence the upper plate 28 of the filter as the boss 59 revolves about the collar 54. That throw causes the top plate to vibrate in a gyratory manner carrying the filtering screen with it as permitted by the spring 33 which it surrounds. The extent of the movement of the top plate 28 and filtering screen 25 is illustrated by the broken lines 71 of FIG. 1.

That gyratory movement causes the screen 25 to continuously jar the impinging particles off the screen thereby permitting them to drift down to the bottom of the container 11. Additionally, as the screen gyrates, a portion of the clean fluid within the confines of the screen is caused to pass outwardly with respect to the screen thereby further tending to clean particulate material from the screen. Preferably, the size of the outlet 13 is so selected that the inside of the filter cylinder is maintained full of clean fluid at all times, thereby insuring that the rapid movement of the filter screen or cylinder causes a portion of the clean fluid to be driven out through the holes of the screen and thus to wash particles from the screen.

The invention is adaptable for use with any type of filtering screen as, for example, a very fine mesh silk screen or a rather coarse mesh, depending upon the size of the impurities which are to be removed from the liquid.

While there is described above the preferred form of apparatus of the invention, it should be well understood that modifications may be made in that preferred form of the apparatus without departing from the scope of the invention as set forth in the following claims:

Having described my invention, I claim:

1. Filtering apparatus comprising
    a closed container having an inlet and an outlet
    a filter mounted in said container between said inlet and outlet and comprising
    a bottom plate fixed to said outlet and having a hole communicating with said outlet
    a top plate
    a helical spring mounted between said top and bottom plates,
    a screen surrounding said spring and secured to said top and bottom plates,
    and means for moving said top plate through a substantially horizontal orbital path of movement as fluid passes from said inlet to said outlet.

2. Filtering apparatus as in claim 1, further comprising,
    means associated with said top plate moving means for varying the movement of said top plate.

3. Filtering apparatus as in claim 1 in which said top plate moving means comprises
    a circular wheel projecting upwardly from said top plate,
    a motor having a downwardly depending shaft coaxial with said wheel,
    a boss eccentrically mounted with respect to said motor shaft and engageable with said wheel.

4. Filtering apparatus as in claim 3 further comprising means for adjusting the radial displacement from the motor shaft axis of said boss.

5. Filtering apparatus as in claim 1 further comprising
    said container having a top wall having a large opening therein,
    said top plate moving means passing through said opening,
    and an elastomeric seal between said top wall and said gyrating means.

6. Apparatus as in claim 1 further comprising
    a vertical support for said container,
    said container having a removable top wall,
    an arm pivoted to said vertical support and overlying said top wall,
    a motor mounted on said arm and having drive means passing through said top wall to said top plate to form said top plate moving means.

7. Apparatus as in claim 6, said drive means including
    a stub shaft projecting above said top plate,
    a cup drivably associated with said motor and freely receiving said stub shaft,
    and means sealing said cup in an opening in said top wall.

* * * * *